United States Patent [19]

Karnofsky

[11] 4,219,470

[45] Aug. 26, 1980

[54] PROCESS FOR PREPARING A PROTEIN CONCENTRATE AND THE PRODUCT OBTAINED THEREBY

[75] Inventor: George B. Karnofsky, Pittsburgh, Pa.

[73] Assignee: Dravo Corporation, Pittsburgh, Pa.

[21] Appl. No.: 953,641

[22] Filed: Oct. 23, 1978

Related U.S. Application Data

[63] Continuation of Ser. No. 611,066, Sep. 8, 1975, abandoned.

[51] Int. Cl.$^2$ .............................................. A23J 1/14
[52] U.S. Cl. ................................. 260/123.5; 426/656
[58] Field of Search ...................................... 260/123.5

[56] References Cited

U.S. PATENT DOCUMENTS

| 2,143,023 | 1/1939 | Meigs | 260/123.5 |
|---|---|---|---|
| 2,444,241 | 6/1948 | Beckel et al. | 260/123.5 |
| 2,599,016 | 6/1952 | Renner | 260/123.5 |
| 3,682,646 | 8/1972 | DePaolis | 260/123.5 |
| 3,714,210 | 1/1973 | Schweiger et al. | 260/123.5 |
| 3,734,901 | 5/1973 | Hayes et al. | 260/123.5 |
| 3,816,389 | 6/1974 | Mihara et al. | 260/123.5 |
| 3,895,003 | 7/1975 | Swain et al. | 260/123.5 |
| 3,897,574 | 7/1975 | Pass | 260/123.5 |
| 4,144,229 | 3/1979 | Karnofsky | 260/123.5 |

*Primary Examiner*—Walter C. Danison
*Attorney, Agent, or Firm*—Louis E. Marn; Elliot M. Olstein

[57] ABSTRACT

There is disclosed a process for the sequential extraction of carbohydrates and oil from particulate oleaginous seed materials utilizing aqueous alcohols as the solvent to produce a novel protein concentrate.

13 Claims, 1 Drawing Figure

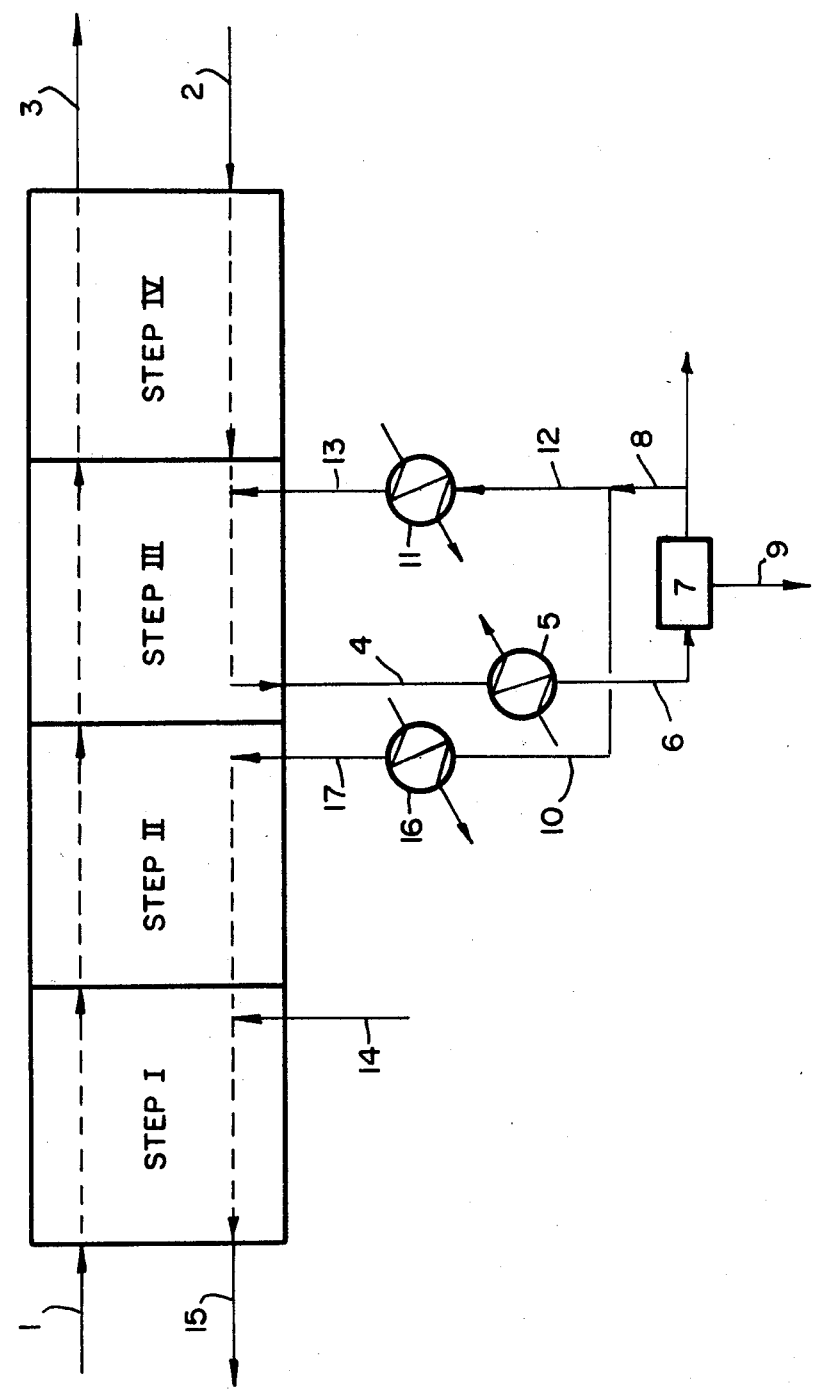

PROCESS FOR PREPARING A PROTEIN CONCENTRATE AND THE PRODUCT OBTAINED THEREBY

This is a continuation of application Ser. No. 611,066, filed Sept. 8, 1975, now abandoned.

BACKGROUND OF THE INVENTION

This invention relates to the solvent extraction of oleaginous seed materials, and more particularly to a novel process for treating oleaginous seed materials utilizing aqueous alcohol to produce a novel protein concentrate.

Protein concentrates are presently made from oil seeds by extracting oil and at least some of the carbohydrates, leaving a residue high in protein. "Soy Protein Concentrate" is a product made in this way from dehulled soybeans so that the residual product contains at least 70% protein (dry basis). At present, Soy Protein Concentrate is made by extracting carbohydrates from so called "white flakes," which are prepared by extracting oil with hexane from dehulled, flaked soybeans and carefully desolventizing the extracted flakes so as to minimize protein denaturation. Selective extraction of carbohydrates from white flakes is now commercially accomplished by using as the solvent aqueous alcohol or slightly acidified water.

In current soybean practice, a large proportion of the soybeans are crushed to produce animal feed. The processes used comprise: cracking, at least partially dehulling, heating (conditioning), flaking, extracting with hexane, recovering solvent from the extracted flakes with heat (desolventizing), and heat treating (toasting) the desolventized flakes so as to improve the digestibility for animals. Toasting also diminishes protein solubility. Toasted meal is not deemed to be the best product for human consumption, primarily because its reduced protein solubility makes it less compatible for mixing with other food ingredients and additionally because it still contains the carbohydrates which cause flatulence.

When soybeans are to be used for human consumption, they are more carefully stored, cleaned and dehulled than are beans used for the production of animal food; and they are carefully desolventized after hexane extraction with minimal heating so as to preserve protein solubility. White flakes so made can be used directly as soy flour or extruded to make texturized vegetable protein (TVP), products which still have the disadvantage that they have a beany taste and contain the carbohydrates which cause flatulence. Partial extraction of carbohydrates from white flakes, particularly with an aqueous alcohol, produces a soy protein concentrate free of the beany taste and of those carbohydrates which cause flatulence. In U.S. Pat. No. 3,734,901 to Hayes et al, there is disclosed a process for removing such materials using an extraction medium comprised of a hydrocarbon solvent and a monohydric alcohol. The carbohydrates extracted in the production of soy protein concentrate, for which there is no present commercial use, are best disposed of by adding them to soybean meal to be used as animal feed.

Typical soybeans contain about 18.5% oil, 8.8% fiber and ash, 35.2% protein, 25.5% carbohydrates and phosphatides and 12% water. Soy Protein Concentrate is made from the beans as a residual product containing at least 70% protein (dry basis) by removing hulls, most of the oil, more than half the carbohydrates and phosphatides, and a little protein. A material balance, based on 100 parts of dry soybeans is:

|  | Soybeans | SPC | Removed |
| --- | --- | --- | --- |
| Oil | 21.0 | 0.6 | 20.4 |
| Ash and fibers | 10.0 | 3.1 | 6.9 |
| Protein | 40.0 | 38.7 | 1.3 |
| Carbohydrates and Phosphatides | 29.0 | 13.0 | 16.0 |
|  | 100.0 | 55.4 | 44.6 |

Carbohydrates can be selectively extracted from white flakes with aqueous alcohols such as methanol, ethanol, and isopropanol, which range in concentration from 50-75% by weight. I have disclosed such a process in copending application Ser. No. 549,434, assigned to the same assignee as the present invention.

Strong alcohols have been proposed for the extraction of soybean oil from soybean flakes particularly because the product oil is semi-refined and the extracted flakes, are whiter than those extracted with hexane. However, proposed commercial processes based on alcohol extraction have had serious deficiencies; and alcohols have never been competitive with hexane as solvents for soybean oil. Although soybean oil is completely miscible with pure ethanol at its boiling point, addition of small amounts of water considerably reduces oil solubility. At the boiling temperature, and at the azeotropic composition, i.e. 95.6 weight percent ethanol, oil solubility is 13%; at 92 weight percent ethanol, oil solubility is reduced to 7%. It is not practical to extract with alcohol concentrations greater than the azeotropic, or to increase solubility by operating under pressure. Processes have been proposed which take advantage of the considerably diminished solubility of oil in cold alcohols. After cooling the miscella (solution of oil in alcohol) to precipitate oil, the separate alcohol phase can be recycled as almost the equivalent of fresh solvent, provided that the miscella is cooled to a sufficiently low temperature. These processes have failed because the miscella must be cooled to below room temperature (thus requiring refrigeration), because there is also the precipitation of a troublesome solid phase, and because it is necessary to dry the flakes to less than 3% water to avoid dilution of the recycling alcohol.

Since two separate extraction and desolventizing processes are now required for the production of soy protein concentrate, there is a need for a process capable of making a soy protein concentrate directly from full-fat flakes without an intermediate desolventizing step, using only aqueous alcohols as solvents for oil, carbohydrates and phosphatides

OBJECTS OF THE INVENTION

An object of the present invention is to provide a novel process for treating oleaginous seed materials using aqueous alcohol as the extraction solvent for the carbohydrates, phosphatides and oil.

Another object of the present invention is to provide a novel process for treating soybean flakes using aqueous ethanol as the extraction solvent for the carbohydrates, phosphatides and oil.

Still another object of the present invention is to provide a novel process for treating soybean flakes using percolation extraction techniques, with aqueous ethanol as the solvent for the carbohydrates, phosphatides and the oil.

A further object of the present invention is to provide a novel process for preparing a novel protein concentrate by extracting particulate oleaginous seed materials using aqueous alcohol as the extraction solvent for the carbohydrates, phosphatides and oil.

A still further object of the present invention is to provide a novel process for the sequential extraction of carbohydrates, phosphatides and oil from oleaginous seed materials without intermediate desolventizing.

Still another object of the present invention is to provide a novel protein concentrate.

SUMMARY OF THE INVENTION

These and other objects of the present invention are achieved by extracting particles of oleaginous seed material with a dilute aqueous alcohol solution to extract carbohydrates and phosphatides followed by oil extraction utilizing concentrated alcohol.

In a preferred embodiment of the present invention for preparing a new protein concentrate, the particulate oleaginous seed material is sequentially extracted in three steps, comprising: contact with a relatively dilute aqueous alcohol to remove carbohydrates and phosphatides; contact with concentrated alcohol to remove the dilute alcohol; and contact with concentrated alcohol at or near the boiling point to remove oil, followed by desolventizing of the residual solids matter.

In a particularly preferred embodiment of the present invention for preparing a novel protein concentrate, the oleaginous seed material is sequentially extracted in four steps, comprising: contact with a relatively dilute aqueous alcohol to remove carbohydrates and phosphatides, contact with concentrated alcohol to remove water; contact with undistilled, recycled concentrated alcohol at or near the boiling point to partially remove oil; and contact with distilled concentrated alcohol at or near the boiling point to complete oil removal. The novel protein concentrate is obtained by desolventizing the extracted residue.

BRIEF DESCRIPTION OF THE DRAWING

A better understanding of the present invention as well as additional objects and advantages thereof will become apparent upon consideration of the detailed disclosure thereof when taken with the accompanying drawing illustrating a schematic flow diagram of a particularly preferred embodiment of the invention.

DETAILED DESCRIPTION OF THE INVENTION

Although the process is described in detail as applied to soybeans, it is to be understood that it is equally applicable to other oilseeds, such as cottonseeds, peanuts, sesame seeds, sunflower seeds, i.e. seeds containing high concentrations of nutritious proteins.

Soybean flakes are prepared by first cracking clean beans between corrugated rolls into 4 to 8 pieces which are then dehulled, softened by heat at about 160° F. and flaked between smooth rolls. Soy flakes are typically about 0.5 inch in diameter and 0.010 inch thick. Other oil seeds may be similarly flaked or simply ground to a maximum particle size of about 0.25 inch. Such flakes, as now prepared for hexane extraction, are equally well suited for the process herein disclosed.

The process in its most preferred application comprises four sequential steps. These steps are shown diagrammatically in FIG. 1. Particulate oleaginous seed materials entering at the left in line 1, pass through Steps I, II, III and IV, sequentially. Hot aqueous alcohol, typically 92 weight percent ethanol at its boiling point, enters Step IV in line 2 and flows countercurrent to the flakes, which exit the process in line 3. Miscella (extract solution) exiting Step III in line 4 is cooled in a heat exchanger 5 to precipitate an oil phase. Mixed phases in line 6 are separated in a decanter or centrifuge 7, from which the alcohol phase exits in line 8 and the heavier oil phase exits the process in line 9. The alcohol phase is divided, a controlled portion flowing to a heater 11 through line 12, the remainder introduced into a heater 16 through line 10. Heated solution recycles to Step III through line 13; heated solution advances to Step II through line 17. Solvent exiting Step II is mixed with dilute ethanol entering in line 14, forming the dilute solution that is desired in Step I. Final miscella containing carbohydrates and phosphatides in solution exits the process in line 15.

I have found that substantially all of the alcohol-soluble carbohydrates and phosphatides in Steps I and II. Oil which enters Step II in the liquid stream in line 17 is completely precipitated as the alcohol is diluted in Steps II and I. Precipitated oil deposited on the flakes is recycled to Step III and redissolved. Carbohydrate miscella exiting in line 15 is free of undissolved oil. Oil exiting in line 9, having been precipitated from a solution containing little carbohydrate and phosphatides, is pale yellow and free of "break".

As applied to soybeans, in Step I carbohydrates and phosphatides are extracted from the full-fat flakes at temperatures preferably in the range of 95° to 150° F. using as solvent aqueous ethanol in the concentration range of 50 to 70 weight percent. In Step II, flakes are dewatered, preferably at the same temperature as in Step I, by extraction with approximately 90 weight percent ethanol. In Step III, most of the oil is extracted into a recycling stream of approximately 90 weight percent ethanol In Step IV, the remainder of the oil is extracted with approximately 92 weight percent ethanol.

Extraction temperature and alcohol concentration in Step I depends on the properties desired in the end product protein concentrate. High temperature and low concentration cause rapid loss of protein dispersibility and water absorption, which it is sometimes desired to preserve. I have disclosed in copending application Ser. No. 549,434, assigned to the same assignee as the present invention, that Soy Protein Concentrate with a high protein dispersibility index (PDI) can be obtained by prolonged extraction with 70% ethanol at 95° F. If PDI is of no concern, extraction can be accelerated and a lower ratio of solvent to flakes employed by extracting with ethanol as dilute as 50% and at temperature as high as 160° F.

In Step II, dilute alcohol carried with the flakes from Step I is displaced by concentrated alcohol. The flakes must be effectively contacted for a time sufficient for complete displacement. Since extraction of oil in Step II is not desired, the temperature must be well below the boiling point of concentrated alcohol. I prefer as a practical matter to have the temperature in Step II the same as that of Step I. This is particularly true when high PDI in the protein concentrate product is desired, since protein will be rapidly denatured if the flakes are in contact with hot dilute alcohol before being displaced by concentrated alcohol.

In Steps III and IV, oil is extracted by concentrated alcohol at or near the boiling temperature. Since soybean oil has a solubility of only about 4% in boiling 90 weight percent ethanol, and the maximum practical concentration of the ethanol recovered by distillation in line 2 is about 92%, it becomes apparent why Step III is generally required, and why almost complete displacement of dilute alcohol in Step II is essential. Oil is removed from the system by virtue of the difference in its solubility at the boiling temperature and at the temperature in line 6, which without resort to refrigeration is at least 100° F. With 90% ethanol, this difference is about 3%. Thus, if 18 lbs. of oil is to be extracted from 100 lbs. of full-fat flakes, the flow in line 4 must correspond to at least 600 lbs. (18/0.03). If the concentration of alcohol in line 4, which is determined by the amount of water entering with the flakes from Step II, falls much below 90%, the flow in line 4 becomes prohibitively high.

In general, I prefer to cool the miscella in line 4 to the minimum that is practical with the cooling water available, in order to minimize recycle to Step III and to improve extraction in Step IV. It is to be understood, however, that the heater 16 may be optionally omitted by controlling the temperature in line 6 at the temperature desired in Step II. It is also to be understood that if oil solubility at the solvent boiling point is high, Step III may be omitted, i.e. lines 12 and 13 and the heater 11. It is also to be understood that it is desirable to have a minimum of solvent carried with the solids leaving each step.

There has been disclosed and used a great variety of equipment and methods for extracting particulate oleaginous seed materials. In less preferred methods, particulates are immersed in and conveyed through the solvent, either in countercurrent stages, each consisting of a soaker followed by solids-liquid separation, or in a column or conveyor in which there is counterflow of particulates and solvent. When the particulates are flakes, there is considerable breakage and fines in the miscella which are troublesome. It has been the experience in the extraction of oilseeds that percolation extraction, defined as a process in which the particulates form beds through which solvent percolates, is superior to immersion extraction. The reasons are that the bed itself is an excellent filter for the miscella, that the spent particulates can be drained by gravity prior to desolventizing, that the bed affords efficient contact between particulates and solvent, and that there is practically no mechanical wear of the equipment.

Although the process of my invention may be practiced in any suitable countercurrently operated liquid-solids contactors used for washing or leaching, I prefer, based on the experience of the oilseed industry, to employ percolation extraction techniques. A commercially proven extractor particularly suited for the practice of my invention is the rotary extractor described in U.S. Pat. No. 2,840,459.

In that extractor, a rotor divided into sector cells rotates in a vapor-tight tank above stationary stage compartments. Each cell is open at the top and closed at the bottom by a hinged perforated door. Solids are fed continuously into each cell as it passes under a loading zone, and fall from the cell when its door opens above a discharge zone almost completely around the circle from the feed zone. Solvent is advanced counter to the direction of rotation by a series of stage pumps, which pump miscellas of gradually increasing concentration into distribution manifolds positioned over the free-draining beds formed in the cells.

In percolation extraction practice, the flakes are usually slurried in miscella before they are introduced into the extractor to form the free-draining bed. The bed so formed is homogeneous and free of air pockets. As disclosed in my aforementioned copending application, flakes to be extracted with an aqueous alcohol must be slurried in recycle miscella and soaked for 5-10 minutes, to ensure that they are completely swelled. Soybean flakes swell considerably when soaked in dilute alcohol. Full-fat flakes sufficient to make a bed having a volume of one cubic foot, after soaking in 55 weight percent ethanol, formed a bed whose volume is 1.4 cubic feet. If this swelling occurs in place after the bed is formed, the bed becomes impermeable to solvent flow.

Extraction of flakes in a percolation extractor can be faithfully simulated in the laboratory by percolating through a bed of flakes in a stationary vertical tube a succession of miscellas of decreasing concentration, corresponding to the miscellas collected in the stage compartments and pumped to the manifolds by each stage pump. To establish correct concentrations of the miscellas, a first batch of flakes is extracted with fresh solvent only, and the miscella draining from the bed is collected in successive measured cuts. The first cut, equivalent to final miscella, is discarded, and other cuts are percolated in succession through a second batch of flakes, followed by an amount of fresh solvent whose ratio to flakes in the batch is the same as the ratio of solvent to flakes fed in the continuous process being simulated. After treating several batches of flakes, the concentration of the miscella cuts reach a steady state characteristic of the operation of a continuous extractor.

Simulation of the complete process of FIG. 1 by extraction of successive batches is more complex. Nevertheless, the four-step process can be simulated by accumulating four sets of miscella cuts, advancing miscella from Step IV to III to II to I, and carrying out the cooling, mixing, recycling, and reheating shown in FIG. 1.

The parameters that determine the steady state in any one step of extraction are temperature, ratio of solvent to feed, and time. Simulation of the four-step process of FIG. 1 is more complex in that additional parameters must be selected, e.g. solvent flow in both lines 2 and 14, recycle solution flow in line 13, temperature of two-phase flow in line 6, and retention time in each of the four steps.

EXAMPLE OF THE INVENTION

Full-fat soybean flakes were extracted in accordance with my invention. The flakes made from soybeans harvested in 1974, a year of bad weather, contained only 38.9% protein (dry basis) compared with the 40.0% protein expected in normal years. Commercial plants employing dilute ethanol for extraction of carbohydrates from white flakes have experienced difficulty in making from these soybeans, concentrates with the required 70.0% protein (dry basis).

In a number of successive batches, flakes were pre-soaked in the solution equivalent to that in line 15 (FIG. 1) for 10 minutes and then poured into a vertical glass tube closed at the bottom by a screen. Each batch was treated in immediate succession with aqueous ethanol solutions as in FIG. 1. Retention time in each step was one hour. The runs were based on the following additional parameters using as a basis 100 pounds of flakes:

| | |
|---|---|
| Temperature in Steps I and II | 130° F. |
| Temperature in Steps III and IV | Boiling |
| Flow in line 2 | 170# |
| Flow in line 13 | 700# |
| Flow in line 14 | 230# |
| Ethanol concentration in line 2 | 92 wt.% |
| Ethanol concentration in line 14 | 45.9 wt.% |
| Temperature in line 6 | 110° F. |
| Temperature in line 17 | 130° F. |
| Temperature in line 13 | Boiling |

When the steady state was reached, the various streams were measured as set forth in the following Table I:

TABLE I

| Lines | 15 | 9 | 4 | 8 | 3 |
|---|---|---|---|---|---|
| Flow (pounds) | 370 | 21.5 | 883 | 861 | 116.5 |
| Solids (wt.%) | 4.8 | — | — | — | — |
| Oil (wt.%) | 0.05 | — | 3.3 | 1.1 | 1.0* |
| ETOH Conc. (wt.%) | 58.0 | — | 89.9 | — | — |
| Volatiles (wt.%) | — | 8.5 | — | — | 50 |
| Proteins (wt.%) | 0.38 | — | — | — | 72.1 |

*dry basis

The concentrate produced by this Example had a protein concentration (dry basis) of 72.1%. Residual lipids measured by the acid hydrolysis method measured only 1.5%, reflecting unusually good phosphatides removal, and accounting for the unexpectedly high protein content.

The air-desolventized product had a PDI of 9 and a water absorption index of 385. It was bone-white and completely tasteless.

These data can be the basis for a commercial process, which includes in its entirety distilling solvent from the oil phase in line 9; desolventizing the extracted flakes in line 3 to form a novel protein concentrate; separating phosphatides from the carbohydrate-enriched miscella in line 15; and distilling the miscella in line 15 to recover the strong alcohol in line 2 and the dilute alcohol in line 14 as distillates, and the carbohydrates as bottoms. Distillation of carbohydrate solutions may be best performed in accordance with the teachings of my copending application Ser. No. 519,228, assigned to the same assignee as the present invention.

Soy Protein Concentrate made by the process of the present invention has functional properties at least as good as those made by the conventional process of first extracting oil with hexane then extracting carbohydrates with dilute aqueous alcohol. A product with high PDI can be made by extracting in Step I with 70% alcohol and maintaining the temperature in Step I and II below 100° F. The flakes are not much further denatured at the higher temperature of Steps III and IV, because aqueous alcohol 90% or stronger causes little denaturation.

Soy Protein Concentrate made by the process of the present invention is distinctly whiter than that made by conventional processes. Particularly in respect to color, the product of my invention has not heretofore been made. Since Soy Protein Concentrate may be blended with white flour, color is an important criterion of quality. Oil that needs little further refining can be made by stripping the small amount of alcohol associated with the oil phase in line 9 of FIG. 1.

Although in my experimental work with soybeans, I found no evidence of any deleterious accumulation of carbohydrates or phosphatides in the recycle stream in line 4, it is possible that such an accumulation could occur in prolonged continuous operation or with other oil seeds. The remedy would be to bleed a small stream from line 8 to an evaporator, from which condensed aqueous alcohol would recycle to the process, or to bleed to any other process capable of effecting separation between the accumulated impurity and aqueous alcohol.

Although the process of the present invention is described with reference to aqueous ethanol as to the preferred solvent because there is no objection to a food product containing traces thereof, and to soybeans, it is to be understood that the invention is applicable whatever the aqueous solvent, and whatever the oil seed being treated.

What is claimed is:

1. A process for preparing a protein concentrate by extracting oleaginous seed material comprised of oil, carbohydrates and phosphates which comprises the steps of:
   (a) contacting said oleaginous seed material with a dilute aqueous alcohol stream containing 50 to 70 weight percent alcohol to produce a first miscella containing carbohydrates and phosphatides;
   (b) contacting residue seed material from step (a) with a first concentrated aqueous alcohol stream to displace aqueous alcohol from said residue seed material; and
   (c) contacting residue seed material from step (b) with a second concentrated aqueous alcohol stream to produce a second miscella containing substantially all of said oil.

2. The process as defined in claim 1 wherein said alcohol is selected from the group consisting of the monohydric aliphatic alcohols having from 1 to 4 carbon atoms.

3. The process as defined in claim 2 wherein the alcohol is ethanol.

4. The process as defined in claim 1 and additionally comprising the steps of cooling said second miscella to form an oil phase comprising a portion of the oil in said second miscella and a miscella phase, separating said oil phase from said miscella phase and introducing a portion of said miscella phase into step (b) as said first concentrated alcohol stream.

5. The process as defined in claim 4 wherein the other portion of said miscella phase provides a portion of said second concentrated aqueous alcohol stream of step (c).

6. The process as defined in claim 1 wherein said aqueous alcohol displaced in step (b) is mixed with a stream of dilute aqueous alcohol having an alcohol concentration less than that of said alcohol stream of step(a) to form said aqueous alcohol stream of step (a).

7. The process as defined in claim 6 wherein said first miscella resulting from step (a) is distilled to recover as distillates said dilute aqueous alcohol stream and at least a part of said second concentrated aqueous alcohol stream.

8. The process as defined in claim 1 wherein steps (a) and (b) are effected at a temperature between 95° and 150° F., and step (c) is effected at a temperature at or near the boiling point of said second concentrated aqueous alcohol.

9. The process as defined in claim 3 wherein said aqueous alcohol of step (a) is 50 to 70 weight percent ethanol, and said second concentrated aqueous alcohol of step (c) contains at least 92 weight percent ethanol.

10. The process as defined in claim 1 wherein said residue seed material from step (c) is separated from said second concentrated aqueous alcohol stream and is desolventized.

11. The process as defined in claim 10 wherein solvent obtained from desolventizing is returned to said process.

12. The process as defined in claim 10 wherein said oleaginous seed material is soybeans.

13. The Soy Protein Concentrate product produced by the process of claim 12.

* * * * *